United States Patent
Wu et al.

(10) Patent No.: US 7,888,918 B2
(45) Date of Patent: Feb. 15, 2011

(54) CONTROL CIRCUIT FOR MULTI-PHASE CONVERTER

(75) Inventors: Wenkai Wu, East Greenwich, RI (US); George Schuellein, Narragansett, RI (US)

(73) Assignee: International Rectifier Corporation, El Segundo, CA (US)

( * ) Notice: Subject to any disclaimer, the term of this patent is extended or adjusted under 35 U.S.C. 154(b) by 623 days.

(21) Appl. No.: 11/835,903

(22) Filed: Aug. 8, 2007

(65) Prior Publication Data

US 2008/0036526 A1    Feb. 14, 2008

Related U.S. Application Data

(60) Provisional application No. 60/821,985, filed on Aug. 10, 2006.

(51) Int. Cl.
G05F 1/00    (2006.01)
(52) U.S. Cl. .................. 323/224; 323/283; 323/284
(58) Field of Classification Search .............. 323/224, 323/283, 284
See application file for complete search history.

(56) References Cited

U.S. PATENT DOCUMENTS

| | | | |
|---|---|---|---|
| 6,404,175 B1 | 6/2002 | Yang et al. | |
| 6,628,106 B1 | 9/2003 | Batarseh et al. | |
| 7,372,240 B2 * | 5/2008 | Khayat et al. | 323/283 |

* cited by examiner

Primary Examiner—Shawn Riley
(74) Attorney, Agent, or Firm—Farjami & Farjami LLP

(57) ABSTRACT

A control circuit for use in controlling a phase of a multi-phase voltage converter in accordance with an embodiment of the present invention includes a driver operable to provide a first control signal to a high side switch of a half-bridge of the phase and a second control signal to a low side switch of the half bridge, such that a desired output voltage is provided by the phase, current sensing circuitry operable to detect the output current of the phase, a comparator operable to compare the output current to a threshold current value and a disabling device operable to provide an enable/disable signal to disable the driver when the output current is below the threshold current value.

14 Claims, 1 Drawing Sheet

CONTROL CIRCUIT FOR MULTI-PHASE CONVERTER

CROSS-REFERENCE TO RELATED APPLICATIONS

Figure 1:
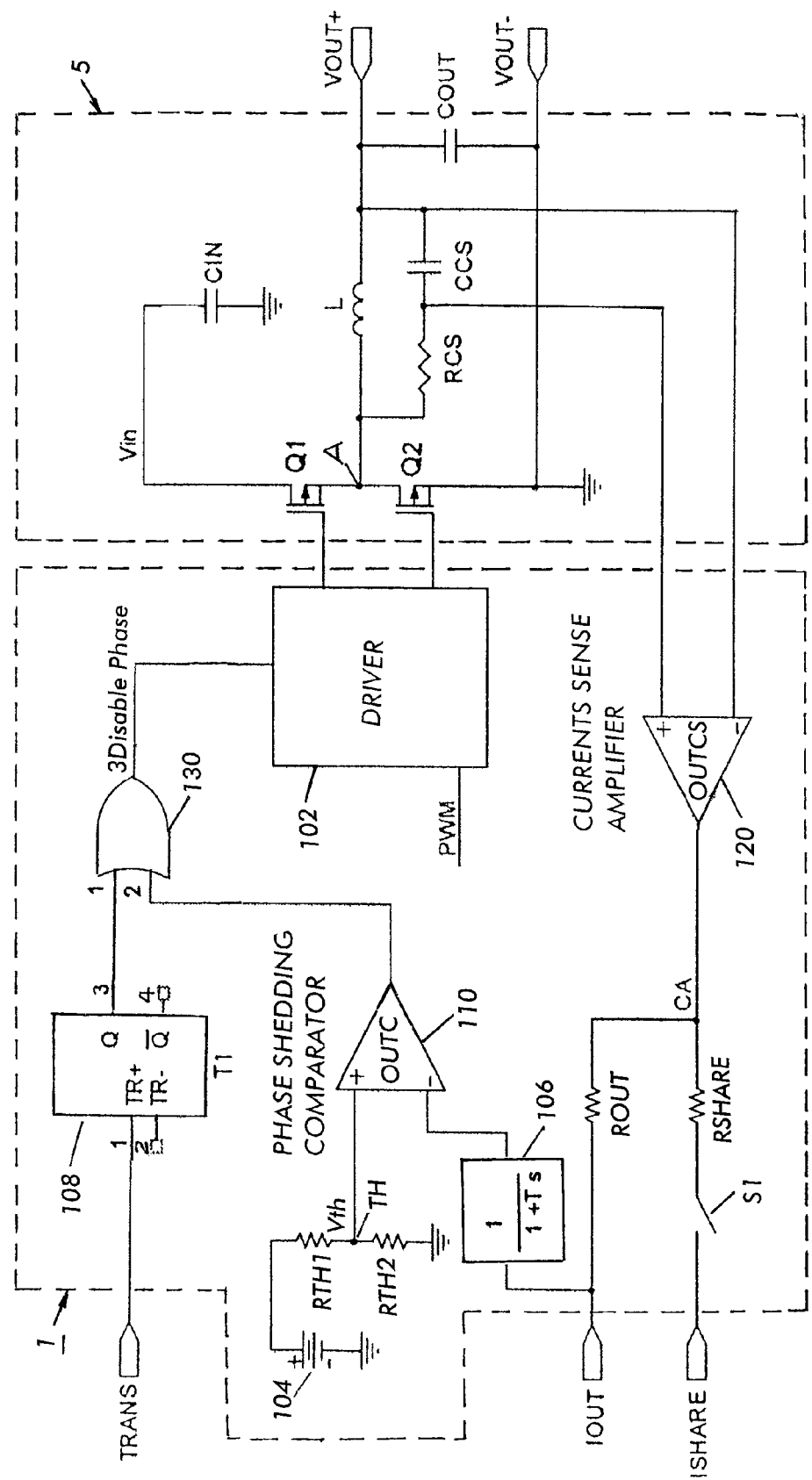

The present application claims the benefit of and priority to U.S. Provisional Patent Application No. 60/821,985 entitled PHASE SHEDDING CONTROL ALGORITHM IN MULTI-PHASE CONVERTER filed Aug. 10, 2006, the entire contents of which are hereby incorporated by reference herein.

BACKGROUND OF THE INVENTION

1. Field of the Invention

The present application relates to an improved method and control circuit for use with a multi-phase voltage converter. In particular, the present application relates to a control circuit that allows for the programmable shut down of individual phases of the multi-phase voltage converter when the output current drops below a predetermined threshold.

2. Related Art

The number of phases included in a multi-phase voltage converter is typically selected or determined based on the thermal requirements of the circuit. Further, it is common to select the number of phases in the converter based on the number of input and output capacitors required at the maximum output current. That is, multi-phase voltage converters are typically designed based on the maximum output current provided by the converter. However, at output currents that are less than the maximum output current, these converters operate less efficiently. Indeed, at lower output currents, the efficiency of such multi-phase voltage converters would be increased if the number of phases were reduced.

Thus, it would be beneficial to provide a control circuit for a multi-phase converter that allows for the programmable elimination of phases.

SUMMARY OF THE INVENTION

It is an object of the present invention to provide a control circuit for use in a multi-phase converter that allows for the programmable elimination of one or more phases of the converter based on the output current provided by the converter.

A control circuit for use in controlling a phase of a multi-phase voltage converter in accordance with an embodiment of the present invention includes a driver operable to provide a first control signal to a high side switch of a half-bridge of the phase and a second control signal to a low side switch of the half bridge, such that a desired output voltage is provided by the phase, current sensing circuitry operable to detect the output current of the phase, a comparator operable to compare the output current to a threshold current value and a disabling device operable to provide an enable/disable signal to disable the driver when the output current is below the threshold current value.

Other features and advantages of the present invention will become apparent from the following description of the invention which refers to the accompanying drawings.

BRIEF DESCRIPTION OF THE DRAWING(S)

FIG. 1 is an illustration of an exemplary control circuit for a multi-phase voltage converter in accordance with an embodiment of the present application.

DETAILED DESCRIPTION OF PREFERRED EMBODIMENTS OF THE INVENTION

By turning off, or shedding, individual phases as the output current decreases in a multi-phase voltage converter, the efficiency of the converter can be increased. Turning off individual phases eliminates gate charging losses, MOSFET switching losses and losses due to circulating currents in the MOSFETS and output inductors in those individuals phases that are shed from the converter. For any particular multi-phase voltage converter, there will be an optimal point where phases should be turned off, one after another, to achieve maximum efficiency over the entire output current range provided by the converter.

A control circuit 1, preferably for use with a multi-phase voltage converter, in accordance with an embodiment of the present invention is described with reference to FIG. 1. In particular, FIG. 1 allows a more detailed view of the control circuit 1 and an individual phase 5 of the multi-phase voltage converter. The phase 5 preferably includes a half-bridge that is controlled to provide a desired voltage at the node A such that a desired output voltage VOUT is provided across the output capacitor COUT via the output inductor L. In particular, the switches Q1 and Q2 of the half-bridge are connected in series across the input voltage Vin and are turned ON and OFF in order to provide the desired voltage at the node A in a known manner. The input voltage Vin is typically provided from a DC bus, for example, in which case the capacitor CIN is preferably a bus capacitor, however, the input voltage may be provided in any appropriate manner. A multi-phase voltage converter typically includes several individual phases, all of which are preferably similar in structure to the individual phase 5 illustrated in FIG. 1. The control circuit 1 allows for the programmable shutdown of individual phases of the multi-phase voltage converter as a function of output current in order to increase overall efficiency of the converter.

The driver circuit 102 provides first and second control signals to drive the high side switch Q1 and the low side switch Q2, respectively, in order to control the voltage at the node A which is positioned between the switches Q1, Q2. As noted above, the voltage at the node A is used to provide the output voltage VOUT via the output inductor L across the output capacitor COUT. Current sensing is preferably provided utilizing current sensing circuitry, such as the current sensing resistor RCS, the current sensing capacitor CCS and the current sense amplifier 120 in a known manner. The current sensing resistor RCS and the current sensing capacitor CCS, are connected in parallel with the output inductor L. The inputs of the current sense amplifier 120 are preferably connected to either side of the capacitor CCS such that the current sense signal CA from the current sense amplifier 120 is indicative of the output current that is drawn by the output load powered by the converter. Specifically, the current sense signal CA represents the voltage across the capacitor CCS, which, in turn, indicates the output current.

This current sense signal CA is preferably provided as one input to the phase shedding comparator 110, which is operable to determine whether the output current is below a threshold current value in order to determine whether the phase 5 should be shed, or shut off. As illustrated in FIG. 1 the comparator 110 is preferably implemented as an amplifier, but any suitable implementation may be used. The current sense signal CA is preferably provided as one input to the comparator 110. A threshold voltage Vth is provided to the second input of the comparator 110. The threshold voltage Vth represents the threshold current value below which it is undesirable for the output current to drop below for efficiency purposes. The threshold voltage Vth is preferably provided at node TH which is positioned between a first threshold resistor RTH1 and a second threshold resistor RTH2. More specifically, the threshold voltage Vth is preferably provided from a threshold voltage source 104 across the first threshold resistor RTH1. Thus, the threshold voltage Vth may be set as desired based on the value of the threshold resistor RTH1 and the threshold voltage source 104. Specifically, the threshold voltage is preferably set for maximum efficiency of the converter.

The comparator 110 compares the current sense signal CA indicative of the output current to the threshold voltage Vth provided at node TH. As illustrated in FIG. 1, the current sense signal CA is preferably provided to the comparator 110 via a filter 106. The time constant of the filter T is preferably set at more than 10x's the switching cycle of the switches Q1, Q2. The output of the comparator OUTC is used by the disabling device 130 to provide an enable/disable signal 3Disable_phase to the driver 102 to enable, or disable, the driver 102 as desired to improve efficiency as the output current drops. The enable/disable signal 3Disable_phase disables the driver 102 when the voltage of the current sense signal CA exceeds the threshold voltage Vth. That is, when the value of the current sense signal CA exceeds the threshold voltage Vth, the output current has dropped below the threshold current value and efficiency will be improved by shutting the phase 5 down.

As illustrated, the converter preferably uses pulse width modulation in the control of the driver 102. To this end, a pulse width modulation signal PWM is preferably provided to the driver 102 in order to control the first and second control signals provided to the switches Q1 and Q2. Pulse width modulation control is well known, and thus, is not described in further detail herein.

In a preferred embodiment as illustrated in FIG. 1, a transient signal is provided via the terminal TRANS. The enable/disable signal 3Disable_phase for enabling or disabling the driver 102 may be based on the transient signal as well. Specifically, in a preferred embodiment, the enable/disable signal 3Disable_phase is provided to the driver 102 via the disabling device 130. The output OUTC of the comparator 110 is provided as one input to the disabling device 130. The other input of the disabling device 130 is connected to the output Q of the flip-flop circuit 108. The input of this circuit is preferably provided with the transient signal from the terminal TRANS. When the transient signal is received, the driver 102 may be shut off with the enable/disable signal. That is, the generation of the enable/disable signal 3Disable_phase by the disabling device 130 is preferably itself enabled based on the transient signal. The disabling device 130 is illustrated as an OR gate in FIG. 1, however, any suitable logic or circuitry may be used. In a preferred embodiment, the enable delay T1 introduced by the flip flop 108 has a value that is more than 10x's the switching cycle of the switches Q1, Q2 and is preferably larger than the time constant T of the filter 106.

The enable/disable signal 3Disable_phase allows the driver 102 to be turned OFF when the output current drops below the threshold current value, that is, when the value of the current sense signal CA exceeds the threshold voltage Vth. As a result, efficiency in the converter is increased since the gate charging losses, MOSFET switching losses and circulating currents in the switches Q1 and Q2 are eliminated along with the losses associated with the output inductor L.

In a preferred embodiment, in order to avoid the generation of a sink current when a phase is turned back on, that is when the enable/disable signal 3Disable_phase enables the driver 102 again, it is preferable that the driver 102 turn the high side switch Q1 ON before the low side switch Q2 is turned on.

While the present application has described the control circuit 1 with reference to control of a single phase 5 of a multi-phase converter, similar control circuitry may be provided for each phase. That is, each phase may include a separate phase shedding comparator 110 and may also utilize a separate and individual threshold voltage. For example, presuming there are N phases in the multi-phase converter, phase N+2 may be turn OFF when the output current drops below a first threshold while phase N+1 stay on until the output current goes below a second threshold. The individual thresholds may be set such that optimum efficiency is provided over the entire current range of output current provided by the converter. Alternatively, the control circuit 1 may control all phases with separate current sense signals provided from each phase and a separate enable/disable signal provided to each phase.

Further, the control circuit 1 of the present application is also usable in scalable voltage converter systems. In such systems it is common to provide separate analog buses to provide for current measuring or reporting and current sharing which are typically connected to external control circuits. A terminal for connection to a current measuring bus is designated IOUT in FIG. 1, while a terminal for connection to a current sharing bus is designated ISHARE in FIG. 1. The switch S1 is provided to disconnect the individual phase 5 from the current sharing bus (terminal ISHARE) when the phase 5 is shut off, or shed. The switch S1 may thus be linked to the enable/disable signal 3Disable_phase, for example, to control the opening and closing thereof. As a result, the output impedance of the scalable converter remains unchanged as the phase 5 is shed.

Further, as noted above, in a preferred embodiment, the disabling device 130 that provides the enable/disable signal 3Disable_phase itself may be disabled. When high repetitive transients are present as indicated by the transient signal (from terminal TRANS), phase shedding is preferably disabled in order to help reduce output impedance, and thus, to reduce overshoot and undershoot during transients. Generally, phase shedding only occurs when a real light load condition is present such that system stability is maintained.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A control circuit for use in controlling a phase of a multi-phase voltage converter, comprises:
   a driver operable to provide a first control signal to a high side switch of a half-bridge of the phase and a second control signal to a low side switch of the half bridge, such that a desired output voltage is provided by the phase;
   current sensing circuitry operable to detect the output current of the phase;
   a comparator operable to compare the output current to a threshold current value; and
   a disabling device operable to provide an enable/disable signal to disable the driver when the output current is below the threshold current value thereby shedding the phase.

2. The control circuit of claim 1, wherein the threshold current value is represented as a threshold voltage provided based on a voltage drop across at least one threshold resistor connected between a threshold voltage source and a first input of the comparator.

3. The control circuit of claim 2, wherein the current sensing circuitry is operable to provide a voltage value indicative of the output current of the phase.

4. The control circuit of claim 3, wherein the voltage value indicative of the output current of the phase is connected to a second input of the comparator via a current filter.

5. The control circuit of claim 4, wherein a time constant of the current filter is set at a level significantly higher than a switching cycle of the high side switch and low side switch.

6. The control circuit of claim 5, wherein an output signal of the comparator is provided to the disabling device such that the enable/disable signal is provided based on the output signal of the comparator.

7. The control circuit of claim 6, wherein the disabling device generates the enable/disable signal to disable the driver when the output signal of the comparator indicates that the voltage value indicative of the output current of the phase is greater than the threshold voltage.

8. The control circuit of claim 7, further comprising transient circuitry operable to receive a transient signal indicative of transient activity in the multi-phase voltage converter and to provide a transient output based on the transient signal.

9. The control circuit of claim 8, wherein a delay imposed by the transient circuitry is set at a second level that is substantially higher than the switching cycle of the high side switch and the low side switch, and larger than the time constant of the current filter.

10. The control circuit of claim 9, wherein the transient output prevents the disabling device from generating the enable/disable signal to disable the driver when the transient output indicates repetitive transients in the multi-phase voltage converter.

11. The control circuit of claim 10, further comprising an output current terminal operable to provide the voltage value indicative of the output current of the phase to an output current bus connected to an external circuit.

12. The control circuit of claim 11, further comprising a current sharing terminal operable to provide the voltage value indicative of the output current of the phase to an output current sharing bus connected to the external circuit.

13. The control circuit of claim 12, further comprising a switch connected between the current sharing terminal and the current sensing circuit, wherein the switch is opened to disconnect the phase from the current sharing when the driver is disabled by the enable/disable signal.

14. The control circuit of claim 13, wherein the driver drives the high side switch on before the low side switch when the driver restarts after being disabled by the enable/disable signal.

* * * * *